United States Patent Office 3,521,490
Patented July 21, 1970

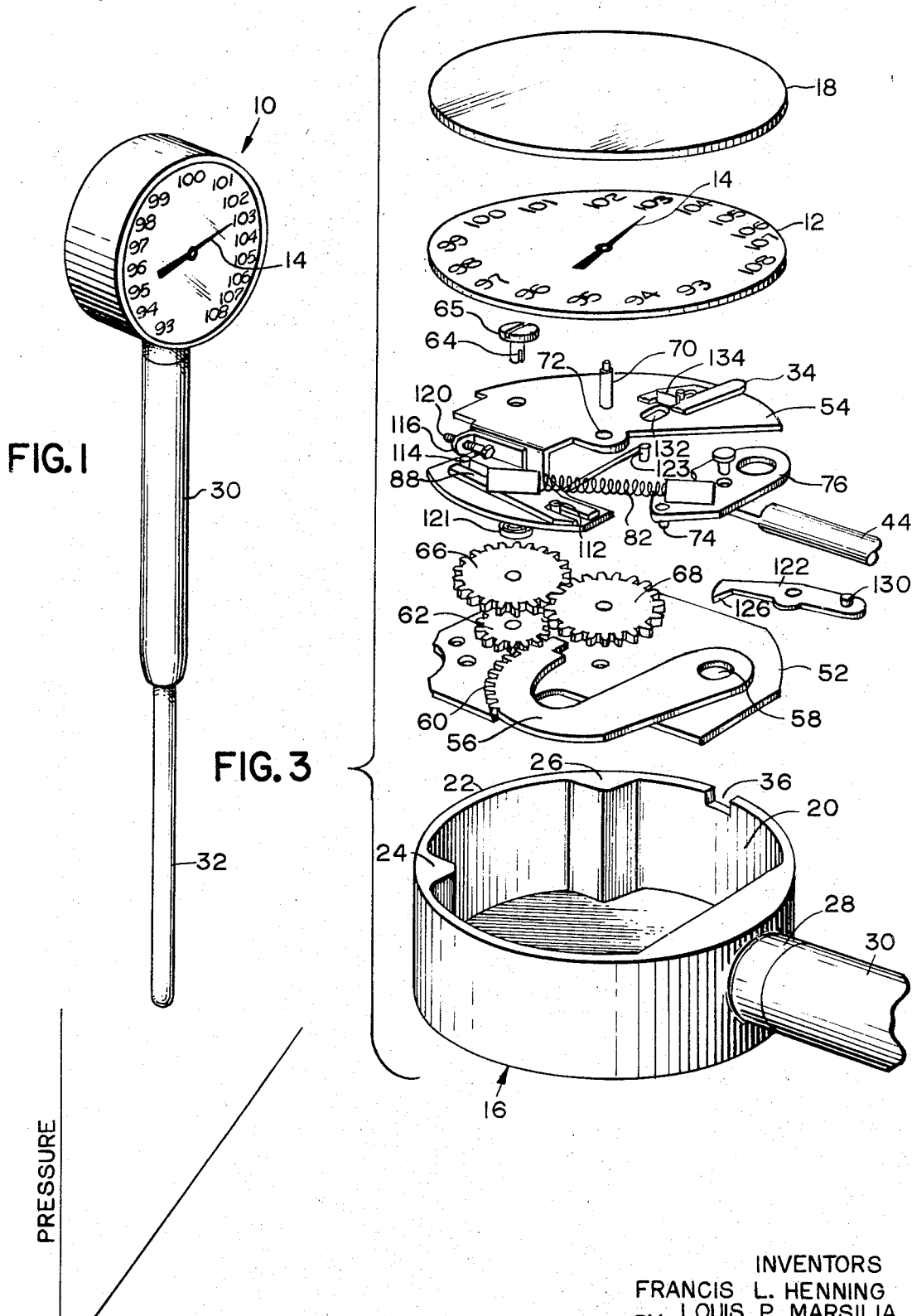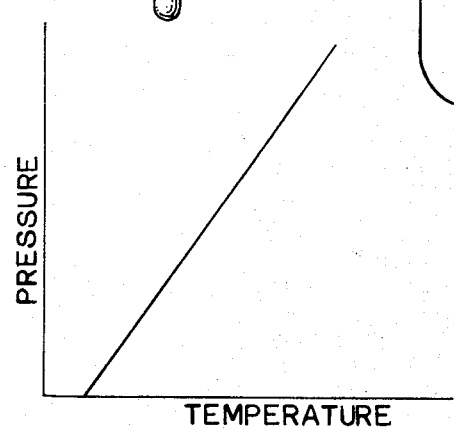

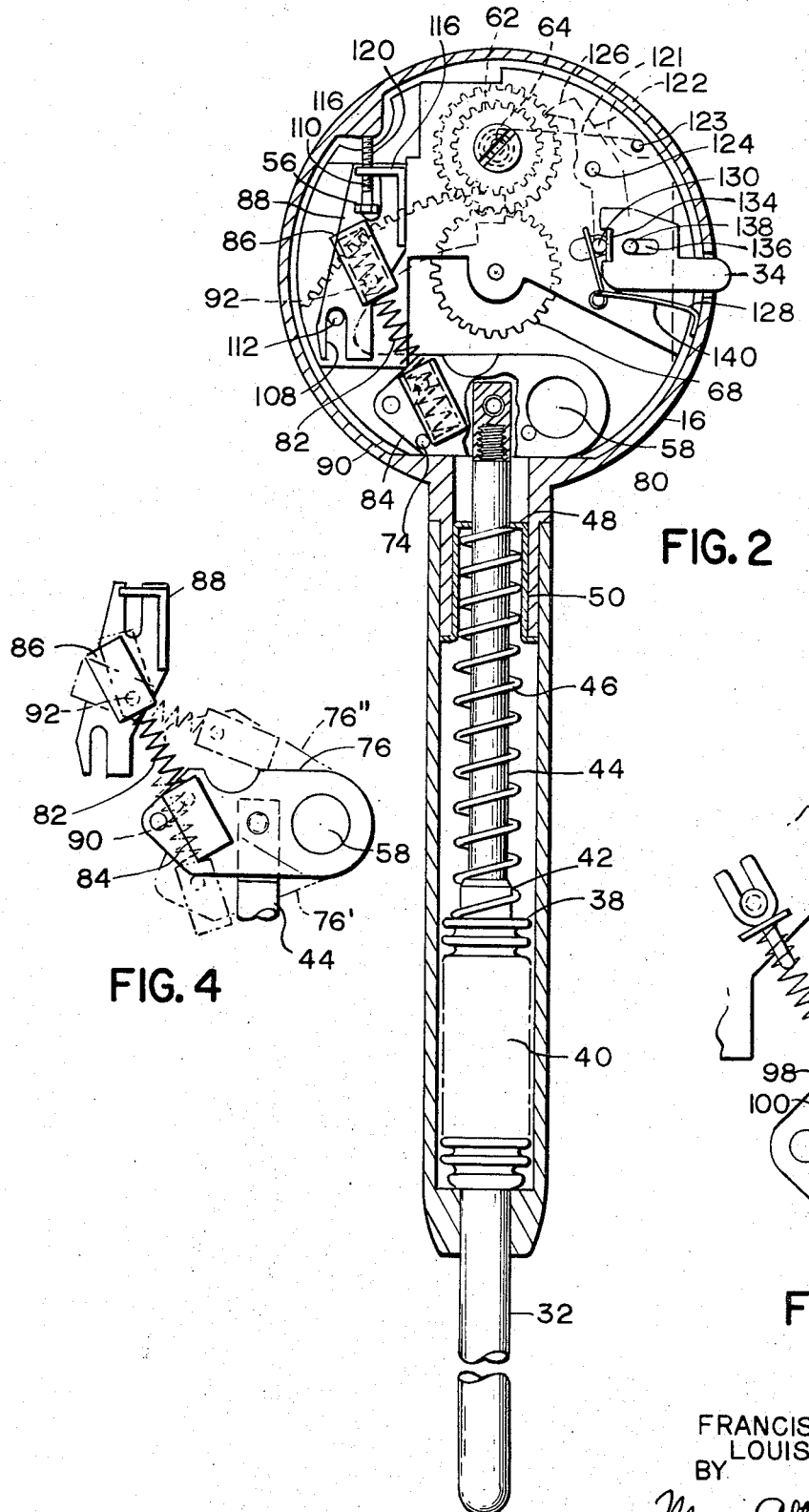

3,521,490
TEMPERATURE MEASURING INSTRUMENT
Francis L. Henning, Roxbury, and Louis P. Marsilia, East Boston, Mass., assignors to Cardinal Instrument Corporation, Cambridge, Mass., a corporation of Massachusetts
Filed Apr. 22, 1968, Ser. No. 722,973
Int. Cl. G01k 5/42
U.S. Cl. 73—368.7
12 Claims

ABSTRACT OF THE DISCLOSURE

A temperature measuring instrument employing an expansible bellows charged with a temperature responsive fluid medium. The bellows is connected to a probe which is applied to the patient. The patient's body temperature heats the fluid medium, increasing its pressure and causing the bellows to expand. A pre-loading spring maintains the bellows in a contracted condition for normal temperatures. The bellows is drivingly connected through a variable spring rate compensating system to a dial indicator and provides a visible temperature reading on a dial face. The drive system includes cooperating lever and spring members which provide a variable compensating force to the bellows so that the movement of the bellows will be substantially constant over its range of operation despite a changing spring rate.

BACKGROUND OF THE INVENTION

Field of the invention

This invention relates generally to temperature measuring devices and more particularly is directed towards a new and improved clinical thermometer characterized by an easily read dial indicator of extremely high accuracy over its operating range and a holding mechanism whereby the indicated temperature will remain on display until reset. This invention also involves a novel spring rate compensating system.

Description of the prior art

The most commonly used clinical thermometer is the well known glass bulb mercury thermometer. Although this thermometer has been in wide use for many years, it suffers from a number of disadvantages in that it is difficult to read, is not particularly accurate and must be read immediately upon removal from the patient before the ambient temperature has time to affect the reading. Furthermore, conventional clinical thermometers are quite fragile and, as a result, suffer from a high breakage rate. One further disadvantage is that care must be taken that the thermometer is never broken while in the patient's mouth insofar as the mercury is toxic the glass fragments may lacerate the patient.

Other types of temperature measuring instruments, including clinical, household and commercial devices, are available but none of these is completely satisfactory from the standpoint of cost, accuracy and reliability.

Accordingly, it is a general object of the present invention to provide improvements in temperature measuring instruments.

Another object of this invention is to provide a safe, highly accurate, clinical thermometer of compact rugged construction and one which may be easily read close to or from a distance.

A still further object of this invention is to provide a temperature measuring instrument in which the recorded temperature will remain set until released to permit reading of the temperature at any time after the thermometer has been removed from the patient or the like.

A further object of this invention is to provide a simple and effective means for compensating for the spring rate of resilient bellows and the like.

SUMMARY OF THE INVENTION

This invention features a temperature measuring instrument, comprising an expansible closed chamber, preferably a bellows, charged with a fluid medium the pressure of which varies with temperature. The bellows is drivingly connected to a dial indicator, or the like, whereby the indicator will respond to a movement of the expansible bellows as a result of a change in temperature of the fluid charge. A locking mechanism is provided to hold the indicator at the highest measured temperature until manually released whereby the recorded temperature may be read with accuracy at any time. This invention also features a system for compensating for changes in the spring rate of the expansible bellows by means of a spring-biased lever operatively connected between the bellows and the dial indicator mechanism. This invention also features a novel means for compensating for changes in atmospheric pressure.

BRIEF DESCRIPTION OF THE DRAWINGS

FIG. 1 is a view in perspective of a temperature measuring instrument made according to the invention, FIG. 2 is a sectional front elevation corresponding to FIG. 1, FIG. 3 is an exploded perspective view of the dial indicator head, FIG. 4 is a detailed, somewhat schematic, front elevation illustrating the spring rate compensation feature of the invention, FIG. 5 is a detailed view showing a modified spring-mounting arrangement and, FIG. 6 is a pressure-temperature curve for ethyl chloride.

DESCRIPTION OF THE PREFERRED EMBODIMENT

Referring now to the drawings, the reference character 10 generally indicates a dial-type thermometer comprising a circular dial 12 suitably inscribed in Fahrenheit degrees, typically from 93° to 108° which is the primary range of interest in clinical applications. Obviously, the range may be changed appropriately for other applications. A needle indicator 14 is mounted on the center of the dial to indicate the measured temperature. It will, of course, be understood that the needle indicator 14 deflects angularly in response to changes in temperature through the system to be described more fully below. The dial face may be provided with different colored zones corresponding to below normal, normal and above normal temperatures.

The instrument 10 is generally organized about a housing 16 provided with a suitable glass or plastic crystal 18 enclosing the open front end of the housing. The housing may be fabricated from plastic, metal, or the like and, in its preferred mode, is comprised of a unitary structure having a generally circular central cavity 20 surrounded by outer walls 22 formed with integral bosses 24 and 26 for use in centering components as will presently appear. The housing is formed with an integral neck portion 28 to which is connected a tubular shank 30 through the end of which extends a probe 32. Also visible from the exterior of the instrument is a reset button 34 projecting through an opening 36 formed through one side of the housing wall 22.

Referring now more particularly to FIGS. 2 through 5 the actuating mechanism for the instrument will now be described in detail. In FIG. 2 there is shown a fluid-charged bellows assembly indicated generally by reference character 38 and including the probe 32, an expansible bellows section 40 and a filling neck 42 connected to a drive rod 44. The bellows section 40 typically is fabricated from metal and is mounted within the tubular shank 30. The expansible bellows section 40 is connected to and communicates with the hollow probe portion 32 such that any change in pressure of the gas contained therein will produce a corresponding increase in pressure within the bellows section, this in turn causing the bellows to expand in an axial direction. Any change in the length of the bellows is transmitted by means of the rod 44 to the indicator drive mechanism mounted within the cavity 20. The bellows assembly 38 is hollow and fabricated from a suitable metal such as phosphor bronze or the like. The assembly, including the bellows probe, is charged with a gas, preferably ethyl chloride, the pressure of which changes in response to changes in temperature. This pressure change is linear over the operating ranges of interest as best shown by reference to the pressure-temperature curve of FIG. 6 in which the characteristics of the gas are graphically shown. In this fashion, when the probe 32 is applied to a patient, for example, the body temperature will warm the ethyl chloride, increasing its pressure and thereby causing the bellows 40 to elongate. This in turn will impart an axial thrust on the rod 44 actuating the dial indicator mechanism best shown in FIGS. 2, 3 and 4. Each one degree change in temperature produces a pressure increase of two pounds per sq. inch of gas. Ethyl chloride has a boiling point of 0° F. and at 95° F. produces a pressure of approximately 30 p.s.i. A further advantage of ethyl chloride is that it is not toxic and should the gas escape by accident no injury will result.

The expansible bellows 40 is resilient and has a characteristic spring rate as does any conventional spring. For this reason the force applied to the connecting rod 44 by the bellows as it expands is not uniform over its travel despite the linear characteristics of the ethyl chloride. Also, at normal ambient temperatures the bellows, if unrestrained, will expand beyond its normal limit. To compensate for the internal pressure of the bellows, it is pre-loaded by means of a coil spring 46 pressed between the upper end of the bellows and an annular flange 48 formed about the upper end of a bushing 50. The bushing 50 is mounted within the neck of the housing in fixed position and coaxial with the connecting rod 44. Typically, the spring 46 furnishes a 20 oz. pre-loading pressure against the bellows which, when charged with ethyl chloride, produces a thrust of 20 oz. at 95° F. The internal pressure of the bellows increases to 3 oz. at 108° F. and the bellows typically has a total travel of .1878" from its extended length to its compressed length, involving a total of 34 oz. of thrust.

The mechanism for converting the axial movement of the rod 44 into the angular motion of the indicator needle 14 and the mechanism for compensating for the changing spring rate of the bellows is organized about a pair of superimposed plates 52 and 54 mounted within the cavity 20. Mounted to the lower plate 52 is an arcuate gear sector 56 pivoted about pin 58 and formed with teeth 60 along its outer extremity. The gear teeth 60 mesh with a pinion 62 fixed to a shaft 64 formed with a slotted head 65 which shaft also carries a gear 66. Gear 66 in turn meshes with a central gear 68 to which is fixed an arbor 70 extending through a central aperture 72 in the plate 54 and carrying at its outer end the needle indicator 14. Thus movement of the arcuate gear sector 56 will cause angular movement of the needle indicator 14.

The gear sector 56 is driven by means of a boss 74 extending rearwardly from the outer portion of a pivotally mounted lever arm 76. The boss engages the outer lower edge of the gear sector which pivots in response to the pivotal movement of the arm 76. The arm pivots about a pin 58 and is drivingly connected to the upper end of the connecting rod 44, preferably by means of a pivot joint 80. The arm 76 acts as a lever which is normally biased in a counterclockwise direction by means of a resilient compensating member 82, preferably a coil spring compressed between pivotal spring-mounting members 84 and 86 mounted respectively on the outer portion of the arm 76 and an adjustable bracket 88 mounted on the plate 54. In the embodiment of FIG. 4 the spring-mounting members 84 and 86 are in the form of oppositely facing cylindrical cups, each pivotally mounted about pins 90 and 92 to their respective supports. In the illustrated embodiment the spring 82 is connected to the lever arm 76 to produce a 2:1 ratio with respect to the rod 44.

In FIG. 4 the lever arm 76 is shown at a mid-position in full line, at a lowered or starting position 76' in broken line, and in a raised position 76" also in broken line. It will be noted that in position 76' the spring 82 is substantially perpendicular to the lever arm 76 so that pivot points 92, 90 and 58 form a substantially right angle. In this position the spring 82 applies a maximum bias against the lever arm 76. The reason for this is that the spring rate of the bellows is at its maximum in its retracted position. As the bellows expands, it forces the lever arm 76 clockwise about pivot 58 increasing the angle defined by the pivot points 92, 90 and 58 and reducing the bias force on the lever arm. This reduction in the bias force on the lever arm corresponds with the decrease in the spring rate of the expanding bellows. The effect of the compensating spring 82 is reduced to zero when the pivot point 90 moves into a dead center position between pivot points 92 and 58 and provides a positive clockwise force on the lever arm 76 when the pivot point 90 moves past dead center. The result is that the decrease in the spring rate of the bellows as it expands is compensated for by the cooperating compensating spring 82 and lever arm 76 which offer a decreasing resistance to the thrust of the connecting rod 44.

It will be understood that if the counterforce to the thrust of the rod 44 were of a constant or increasing nature an error would develop in the system by reason of the decreasing spring rate of the bellows as it expands. However, with the foregoing arrangement the decrease in the spring rate of the bellows is compensated for by the decreasing resistance offered by the pivoting lever arm and compensating spring 82. The result is that the effect of the decreasing spring rate is cancelled out and the linear pressure-temperature characteristics of the ethyl chloride prevail to insure a precise measurement of temperature.

Referring now to FIG. 5 there is illustrated a modified mounting arrangement for the compensating spring 82. In this embodiment the end of the spring 82 is connected to a post 94, which replaces the pivot point 90 of FIG. 4, by means of a bifurcated device 96 formed with a stem 98, a spring engaging shoulder 100 and yoked arms 102 and 104. The upper end of the post 94 is formed with an annular groove in which the yoked arms 102 and 104 are mounted and a clip 106 is mounted over the end of the post to retain the device 96 in position. While a similar device may be mounted on the bracket 88 the cylindrical cup 86 is preferred. The arrangement is such that the device 96 will pivot about the post 94 as the lever arm 76 moves about pivot point 58.

In order to correct for variations in the spring rate of different bellows, adjustment means are provided. The adjustment means includes the bracket 88 which is mounted for relative movement on an offset portion of the plate 54 in a direction parallel to the connecting rod 44. The bracket 88, which carries one end of the compensating spring 82, is formed with a pair of oppositely facing slots 108 and 110 through which fixed posts 112 and 114 extend and serve as guides. The bracket is formed with a tapped flange 116 opposite a flat face formed in the inner wall of the housing 16. An adjusting screw 120 is threaded through the flange and by turning the screw 120 the bracket 88 and pivot point 92 may be moved to or away from the lever arm 76 so as to modify the compensation provided by the spring 82 and lever arm 76. Thus, during assembly, slight differences in the spring rate of different bellows may be easily compensated for by adjustment of the screw 120. Normally, this is done when the instruments are at a precisely known temperature and the screw 120 is turned until the needle exactly indicates this known temperature.

Since changes in atmospheric pressure will have a slight effect on the instrument's accuracy an adjustment can also be made for this factor. This adjustment is made by turning the shaft 64 by means of a screw driver applied to the slotted head 65. A return spring 121 is wrapped about and secured to the shaft 64 at one end with its opposite end secured to a post 123. Adjustment is made by temporarily disengaging the gear 62 from the teeth of the gear sector 56, turning the head 65 so as to tighten or loosen the spring 121 as required and then re-engaging the gears. This adjustment is normally made where it is known that the instrument is going to be used primarily in an area where the atmospheric pressure is generally higher or lower than average as for example in a high mountainous area.

Referring to the right-hand side of the instrument as viewed in FIG. 2 the indicator holding mechanism will be described. This mechanism includes the reset button 34 and a pawl 122 pivoted about pin 124. The pawl is formed with a nose portion 126 which is normally biased into engagement with the teeth of the gear 66 by means of a spring 128 bearing against a post 130. The post 130 is fixed to the opposite end of the pawl and extends through a slot opening 132 in the plate 54 to engage a flange 134 formed on the inner end of the reset button 34. The reset button 34 is formed with a central slot 136 through which extends a guide post 138. The reset button is normally urged outward by means of a spring 140 whereby the reset button will remain stationary while the pawl oscillates under the action of the rotating gear 66. When the temperature reading reaches its maximum position the gear 66 is locked against return by the nose portion of the pawl and this will hold the needle in its indicated position until released by depression of the reset button. It will be understood that by depressing the reset button the flange 134 will bear against the post 130 biasing the pawl out of engagement with the gear 66, permitting it to return to a normal position by means of the return spring 121.

While the invention has been described with particular reference to the illustrated embodiments, it will be understood that numerous modifications thereto will appear to those skilled in the art. For example, the system may be used for other temperature measuring applications such as industrial controls or the like. Also, the spring rate compensating arrangement may be used to advantage in other applications.

Having thus described the invention what we claim and desire to obtain by Letters Patent of the United States is:

1. A spring rate compensating system, comprising
   (a) a first resilient member having a non-linear spring rate in a given direction,
   (b) a lever arm generally perpendicular to said direction and pivotal about an axis at one fixed point displaced to one side of the direction of movement of said first member and drivingly connected to said member at another point along said direction and adapted to be biased about said axis by expansion and contraction of said member, and,
   (c) a second resilient member fixed at one end at a point displaced from the other points and fixed relative thereto and angularly engaging said lever arm at another end at a point on said arm spaced from said one point in offset position to provide an angularly variable counter-biasing force against said arm,
   (d) said second resilient member being pivotally mounted at its ends whereby movement of said arm in said one direction will alter the angular relation between said arm and second member and reduce the counter-biasing force of said second member and thereby compensate for the non-linearity of the spring rate of said first member.

2. A spring rate compensating system according to claim 1 wherein said first member is a spring.

3. A spring rate compensating system according to claim 1 wherein said first member is a fluid charged resilient bellows.

4. A spring rate compensating system according to claim 3 including a spring bearing against said bellows to provide a preload thereon.

5. A spring rate compensating system according to claim 1 wherein said second member is a coil spring.

6. A temperature measuring instrument, comprising
   (a) a fluid charged resilient bellows having a non-linear spring rate in a given direction,
   (b) temperature indicating means responsive to expansion and contraction of said bellows along a path parallel to said direction,
   (c) a pre-loading spring bearing against said bellows to counteract the force of the fluid charge at normal ambient temperatures,
   (d) a lever arm pivoted about an axis at one fixed point located to the side of said path and drivingly connected to said bellows and to said indicating means at points on said arm spaced from said one point, and
   (e) a compensating spring normally disposed at an angle with respect to said arm having one end engaging said arm at a point spaced from said one point and movable therewith and an opposite end being mounted to a relatively fixed position displaced to the side of said path whereby movement of said lever arm in response to expansion and contraction of said bellows will vary the angle between said lever arm and said compensating spring in accordance with the changing spring rate of said bellows to compensate effectively for the nonlinearity thereof.

7. A temperature measuring instrument according to claim 6 wherein said bellows is charged with ethyl chloride.

8. A temperature measuring instrument according to claim 6 including releasable lock means engaging said indicating means for temporarily holding said indicating means at a maximum indicated temperature.

9. A temperature measuring instrument according to claim 6 wherein said temperature indicating means includes at least one gear and an arcuate gear sector pivoted at one end, in mesh with said one gear and drivingly connected to said lever arm.

10. A temperature measuring instrument according to claim 6 including a probe connected to said bellows.

11. A spring rate compensating system, comprising
    (a) a first resilient member having a non-linear spring rate,
    (b) a lever arm pivotal about an axis at one fixed point and drivingly connected to said member at another point and adapted to be biased in one direction by expansion of said member,
    (c) a second resilient member fixed at one end and angularly engaging said lever arm at another end at a point on said arm spaced from said one point in position to provide a counter-biasing force against said arm,
    (d) said second resilient member being pivotally mounted whereby movement of said arm in said one direction will alter the angular relation between said arm and said second member and thereby compensate for the non-linearity of the spring rate of said first member, and
    (e) selectively movable mounting means engaging the fixed end of said second member for selectively changing the relation between said lever arm and said second member.

12. A temperature measuring instrument, comprising
    (a) a fluid charged resilient bellows having a non-linear spring rate, (b) temperature indicating means responsive to expansion and contraction of said bellows, (c) a pre-loading spring bearing against said bellows to counteract the force of the fluid charge at normal ambient temperatures, (d) a lever arm pivoted about an axis at one fixed point and drivingly connected to said bellows and to said indicating means at points on said arm spaced from said one point, (e) a compensating spring normally disposed at an angle with respect to said arm having one end engaging said arm at a point spaced from said one point and movable therewith and an opposite end being relatively fixed whereby movement of said lever arm in response to expansion and contraction of said bellows will vary the angle between said lever arm and said compensating spring in accordance with the changing spring rate of said bellows to compensate effectively for the non-linearity thereof, and (f) a selectively movable member supporting the fixed end of said spring for selectively adjusting the position of said spring relative to said arm.

References Cited

UNITED STATES PATENTS

| | | | |
|---|---|---|---|
| 1,671,985 | 6/1928 | Goosmann | 73—368.7 |
| 2,296,191 | 9/1942 | Russell | 235—144 |
| 3,182,506 | 5/1965 | Schmaus | 73—368.7 |

S. CLEMENT SWISHER, Primary Examiner

W. A. HENRY II, Assistant Examiner